Patented Jan. 14, 1936

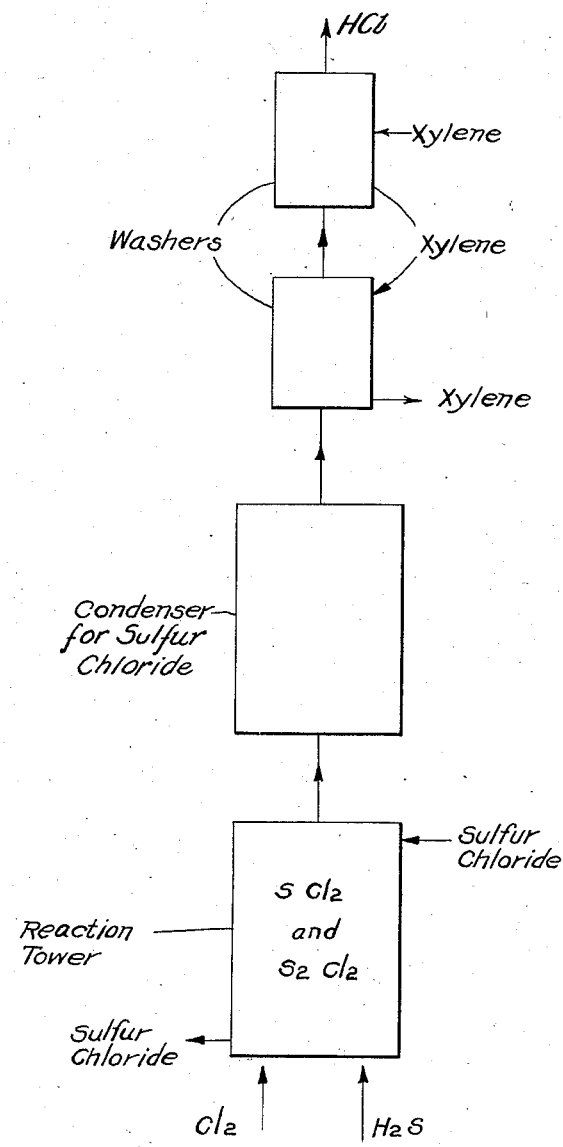

2,028,087

UNITED STATES PATENT OFFICE 2,028,087

PRODUCTION OF HYDROGEN HALIDES

Albert M. Clifford, Stow, Ohio, assignor to Wingfoot Corporation, Wilmington, Del., a corporation of Delaware Application December 12, 1933, Serial No. 702,027

23 Claims. (Cl. 23—156)

This invention relates to the production of hydrogen halides. More particularly it relates to the production of anhydrous hydrogen chloride from hydrogen sulfide and chlorine in the presence of a sulfur chloride. The process is particularly valuable as a method of disposing of waste gases containing chlorine or hydrogen sulfide.

The following equations will be referred to in explaining the process:

(1) $H_2S + Cl_2 \rightarrow 2HCl + S$ (2) $S + SCl_2 \rightarrow S_2Cl_2$ (3) $Cl_2 + S_2Cl_2 \rightarrow 2SCl_2$ (4) $H_2S + SCl_2 \rightarrow 2HCl + 2S$ (5) $H_2S + S_2Cl_2 \rightarrow 2HCl + 3S$ Hydrogen sulfide reacts with chlorine according to Equation 1. If sulfur dichloride is present the sulfur formed by this reaction dissolves in the sulfur dichloride probably forming sulfur monochloride according to Equation 2. If sulfur monochloride is present and an excess of chlorine is supplied to the reaction, sulfur dichloride forms according to Equation 3. If an excess of hydrogen sulfide is present it reacts with the sulfur chlorides according to Equations 4 and 5. According to a preferred method of carrying out the reaction the hydrogen sulfide and chlorine are separately introduced into a mixture of sulfur chlorides including sulfur monochloride and sulfur dichloride. Anhydrous hydrogen chloride is liberated and a mixture of sulfur and a sulfur chloride, generally composed largely of sulfur monochloride, is withdrawn from the reaction vessel.

The process is advantageously carried out in a reaction tower. The sulfur chloride is introduced into the top of the tower and a mixture of sulfur chloride and sulfur is withdrawn from the bottom of the tower. Hydrogen sulfide and chlorine are introduced into the bottom of the tower, preferably thru separate inlets, and in passing up thru the tower react with one another and with the sulfur chloride, and anhydrous hydrogen chloride escapes from the top of the tower. The tower may be filled with suitable material to expose a large surface of the liquid to the gases, or it may contain baffle plates of suitable design to break up the reacting gases into fine bubbles. It is constructed of material which is not attacked by the reagents or the hydrogen chloride formed. It should be of such a structure that sulfur formed in the reaction does not clog the tower and interfere with suitable counter-current flow of the liquid and gases. The process has particular value in the production of hydrogen chloride where the supply of hydrogen sulfide or chlorine, or both is not altogether constant.

Considerable momentary variation in the amount of either or both of the gases introduced into the reaction tower is automatically counteracted by reaction with the sulfur chloride, and the hydrogen chloride formed escapes from the tower without any more than a trace of either the hydrogen sulfide or chlorine. If the hydrogen sulfide and chlorine are introduced into the tower in regulated amounts so that there is just one molecular weight of each they will react according to Equation 1 and the sulfur formed will react with excess sulfur dichloride which may be present to form sulfur monochloride. If there is sufficient sulfur dichloride present the sulfur chloride drawn off from the reaction vessel will contain no solid sulfur. In general the reaction can be more economically carried out if the amount of sulfur chloride introduced into the reaction vessel is such that there is free sulfur in the solvent withdrawn from the reaction tower. If there is at all times or at any time an excess of chlorine introduced into the vessel over that required to react with the hydrogen sulfide, sufficient sulfur monochloride should be present to combine with this excess chlorine to form sulfur dichloride. The sulfur monochloride may be introduced into the tower as such or it may be sulfur monochloride formed from sulfur dichloride and sulfur produced in the reaction. Any excess of hydrogen sulfide will react with either sulfur monochloride or sulfur dichloride to form hydrogen chloride and sulfur.

The chlorine and hydrogen sulfide content of waste gases which may be used in the process need not be uniform and the amount of waste gases containing the hydrogen sulfide and chlorine may vary. In the disposal of such gases reasonable variations in either the chlorine content or hydrogen sulfide content may be compensated for by using a mixture of sulfur monochloride and sulfur dichloride as the solvent and supplying this solvent to the reaction tower at the necessary rate to react with whatever excess of either chlorine or hydrogen sulfide enters the tower. The hydrogen-sulfide- and chlorine-containing gases are advantageously introduced into the reaction vessel thru regulatory means so that the volume of each gas supplied can be controlled.

The process is not limited to the production of hydrogen chloride from waste gases but may be employed in the production of hydrogen chloride from pure chlorine and pure hydrogen sulfide. Either gas may be used in a pure state to react with the other gas in an impure state as it is generated as a by-product in some chemical reaction. If utilized in a pure state the hydrogen sulfide or the chlorine may be introduced into the reaction tower from suitable storage means under pressure.

The process may be employed to utilize waste hydrogen sulfide generated, for example, as a by-product in an organic chemical process in which it is contaminated with carbon disulfide. In this case the gas is preferably passed thru some suitable scrubbing medium, such as aniline, to remove the carbon disulfide and is then introduced into the reaction tower. In such a case it may be desirable to use pure chlorine to react with the hydrogen sulfide. This pure chlorine may be used from storage cylinders or it may be generated by electrolysis of salt for the purpose. It may advantageously be washed with sulfuric acid before entering the reaction tower. Before entering the reaction tower impure gases are advantageously washed with suitable scrubbing means to remove any impurity which may interfere with the reaction or with the recovery of hydrogen chloride of desired purity.

The gases coming from the reaction vessel are advantageously passed thru a condenser to condense out any sulfur chloride which may be volatilized. The sulfur chloride so condensed is advantageously returned to the reaction vessel. The gas leaving the condenser is advantageously first passed thru a trap and then washed with a material such as xylene or toluene which are solvents for sulfur chloride and which react with chlorine to form a chlorinated side-chain product, liberating hydrogen chloride.

The washing of the gases with xylene or toluene is advantageously carried out in two steps. A large proportion of the sulfur chloride is dissolved out of the gases in the first vessel so that the gases going over to the second extraction vessel contain only a very small amount of sulfur chloride. This is substantially completely dissolved in the second extraction vessel. The two extraction vessels may be separately operated and when a considerable percentage of sulfur chloride is dissolved in the first extraction vessel this may be removed from the system and the gases then first introduced into what was formerly the second extraction vessel and then passed thru another extraction vessel containing fresh solvent. If preferred, the two extraction vessels may be so connected that the solvent passes in small amounts, either continuously or intermittently, from the second extraction vessel to the first extraction vessel so that extraction is effected on the counter-current principle. Xylene is preferred as the extraction medium because of its high boiling point. Excess sulfur dichloride and sulfur monochloride are miscible with it in all proportions and it will react with a trace of chlorine and the gases escaping from it are substantially free from both chlorine and sulfur chlorides.

From the xylene extraction the gases are advantageously passed thru a condenser and then thru two sulfuric acid scrubbing vessels in series. These remove traces of xylene and the acid reacts with other organic matter which may be present in the gases.

The scrubbing mediums used for treating the gases before they enter the reaction vessel and after they leave the reaction vessel will be varied, depending upon the source of the gases and the impurities which they contain and the purity of hydrochloric acid desired. By suitable removal of impurities pure anhydrous hydrogen chloride may be formed, and, if desired the gas may be absorbed in water to form pure aqueous hydrochloric acid. The dry hydrogen chloride gas may advantageously be used directly in a process where the anhydrous material is required.

The accompanying flow sheet illustrates various steps which may be used for the production of HCl by reacting chlorine and hydrogen sulfide in the presence of sulfur chloride.

In a reaction where the composition of the solvent introduced into the reaction vessel was approximately 30% of sulfur monochloride and 70% of sulfur dichloride it was found advantageous to maintain the ratio of chlorine to hydrogen sulfide between $5Cl/2H_2S$ and $8Cl/2H_2S$. This gave pure dry hydrogen chloride gas and the solvent drawn off of the reaction vessel contained considerable sulfur. It was found that under such conditions the ratio of chlorine to hydrogen sulfide introduced into the reaction vessel might vary from time to time during the reaction within the limits mentioned without in any way altering the purity of the hydrochloric acid gas formed. The operation was continued for hours without the need for altering the amount of gas introduced or its composition or the rate at which sulfur chloride was introduced into the reaction vessel.

Altho the process has been described as applied to a reaction using sulfur chloride and sulfur dichloride the reaction vessel may also contain sulfur tetrachloride. The sulfur chloride in the reaction vessel may be diluted with any suitable diluent, such as a sufficiently high boiling hydrocarbon solvent.

The process is not limited to a reaction using chlorine and a sulfur chloride in the production of hydrogen chloride as other halogens and sulfur halides may be employed. For example, using sulfur bromide as the solvent, bromine may be caused to react with hydrogen sulfide to form hydrogen bromide. The sulfur chloride and sulfur bromides are liquid at ordinary temperatures and are therefore more suited to the reaction than solid sulfur halides.

The temperature of the reaction vessel may be regulated if necessary, as by cooling with cold water coils if the shape of the reaction vessel is not such as to allow for the radiation of heat generated in the reaction. The temperature of the reaction vessel will depend upon the amount of gases reacted, the temperatures at which the gases are introduced into the reaction vessel and the temperature and rate of flow of the solvent employed. The reaction of chlorine with hydrogen sulfide is advantageously carried out between about 50 and 70° C., altho higher and lower temperatures may be employed.

I claim:

1. The method of producing a hydrogen halide which comprises causing non-equimolecular proportions of a halogen and hydrogen sulfide to react in the presence of a sulfur halide in the liquid phase.

2. The method of producing a hydrogen halide which comprises causing non-equimolecular proportions of a halogen and hydrogen sulfide to react in the presence of a liquid mixture of sulfur halides containing combined sulfur and halogen in different proportions.

3. The method of producing hydrogen bromide which comprises causing non-equimolecular proportions of bromine and hydrogen sulfide to react in the presence of a sulfur bromide.

4. The method of producing hydrogen chloride which comprises causing non-equimolecular proportions of chlorine and hydrogen sulfide to react in the presence of a sulfur chloride.

5. The process of producing hydrogen chloride which comprises causing chlorine and hydrogen sulfide to react in the presence of sulfur dichloride.

6. The method of producing hydrogen chloride which comprises causing chlorine and more than an equimolecular equivalent of hydrogen sulfide to react in the presence of sulfur monochloride.

7. The method of producing hydrogen chloride which comprises causing chlorine and hydrogen sulfide to react in the presence of a mixture of sulfur monochloride and sulfur dichloride.

8. The method of producing anhydrous hydrogen halide continuously which comprises causing varying proportions of the halogen and hydrogen sulfide to react in the presence of a liquid mixture of sulfur halides.

9. The method of disposing of waste gases containing a varying amount of a halogen which comprises causing the halogen in the waste gas to react with hydrogen sulfide in the presence of a mixture of sulfur monohalide and sulfur dihalide.

10. The method of disposing of a waste gas containing chlorine which comprises causing the chlorine to react with hydrogen sulfide in the presence of a mixture of sulfur monochloride and sulfur dichloride.

11. The method of disposing of a waste gas containing a varying amount of hydrogen sulfide which comprises causing the hydrogen sulfide in the waste gas to react with a halogen in the presence of sulfur monohalide and sulfur dihalide.

12. The method of disposing of a waste gas containing hydrogen sulfide which comprises causing the hydrogen sulfide in the waste gas to react with chlorine in the presence of a mixture of sulfur monochloride and sulfur dichloride.

13. The method of producing hydrogen chloride which comprises introducing chlorine gas and hydrogen sulfide into the bottom of a reaction tower and introducing into the top of the tower sulfur chloride of such composition and at such a rate that the hydrogen sulfide and chlorine react with one another and with the sulfur chloride to produce hydrogen chloride gas and a mixture of sulfur and sulfur monochloride, withdrawing the hydrogen chloride gas from the top of the tower and withdrawing the sulfur and sulfur monochloride from the bottom of the tower.

14. In the production of a hydrogen halide from a halogen in the presence of sulfur halide in the liquid phase by a process in which there is at times an excess of halogen, the step which comprises washing hydrogen halide produced with a readily condensable hydrocarbon solvent for the sulfur halide which solvent will readily react with traces of the halogen.

15. In the production of hydrogen chloride by the reaction of hydrogen sulfide and chlorine in the presence of a mixture of sulfur chlorides the step which comprises washing the hydrogen chloride gas produced with a readily condensable aralkyl solvent for the sulfur chlorides.

16. The method of producing hydrogen halides which comprises causing a halogen and hydrogen sulfide to react in the presence of sulfur halide in the liquid phase and washing the hydrogen halide liberated with xylene.

17. The method of producing hydrogen chloride which comprises reacting hydrogen sulfide with chlorine and a sulfur chloride.

18. The method of producing hydrogen chloride which comprises reacting chlorine with hydrogen sulfide and sulfur dichloride.

19. The method of producing hydrogen chloride continuously which comprises causing varying proportions of hydrogen sulfide and chlorine to react in the presence of a mixture of sulfur monochloride and sulfur dichloride such that when the chlorine is in excess of the hydrogen sulfide chlorine reacts with sulfur monochloride to form sulfur dichloride and when the hydrogen sulfide is in excess it reacts with a sulfur chloride to form hydrogen chloride and sulfur and sulfur produced in the reaction reacts with sulfur dichloride to form sulfur monochloride.

20. The method of producing a hydrogen halide which comprises causing gas streams containing varying proportions of a halogen and a hydrogen sulfide to react in the presence of a sulphur halide in the liquid phase.

21. The method of producing hydrogen chloride which comprises causing gas streams containing varying proportions of chlorine and hydrogen sulfide to react in the presence of a sulfur chloride.

22. The method of producing hydrogen chloride which comprises causing hydrogen sulfide and more than a molecular equivalent of chlorine to react in the presence of sulfur monochloride.

23. The method of producing a hydrogen halide which comprises causing a halogen and hydrogen sulfide to react in the presence of a sulfur halide in the liquid phase.

ALBERT M. CLIFFORD.